United States Patent [19]
Wysocki et al.

[11] Patent Number: 5,381,338
[45] Date of Patent: Jan. 10, 1995

[54] REAL TIME THREE DIMENSIONAL GEO-REFERENCED DIGITAL ORTHOPHOTOGRAPH-BASED POSITIONING, NAVIGATION, COLLISION AVOIDANCE AND DECISION SUPPORT SYSTEM

[76] Inventors: David A. Wysocki; Paul S. Hooper, both of Unitech Research, Inc., 3802 Packers Ave., Madison, Wis. 53704

[21] Appl. No.: 154,994

[22] Filed: Nov. 18, 1993

Related U.S. Application Data

[63] Continuation of Ser. No. 718,618, Jun. 21, 1991, abandoned.

[51] Int. Cl.$^6$ .............................................. G06F 15/50
[52] U.S. Cl. ................................. 364/449; 364/461; 348/116
[58] Field of Search ................ 364/443, 444, 449, 461, 364/420, 578; 73/178 R; 340/729, 988, 990, 995; 348/113, 116, 118, 139

[56] References Cited

U.S. PATENT DOCUMENTS

| | | | |
|---|---|---|---|
| 4,489,389 | 12/1984 | Beckwith et al. | 358/103 |
| 4,682,160 | 7/1987 | Beckwith, Jr. et al. | 340/729 |
| 4,829,304 | 5/1989 | Baird | 364/449 |
| 4,835,537 | 5/1989 | Manion | 364/461 |
| 4,837,700 | 6/1989 | Ando et al. | 364/449 |
| 4,985,854 | 1/1991 | Wittenburg | 340/729 |
| 5,072,396 | 12/1991 | Fitzpatrick et al. | 358/103 |
| 5,115,398 | 5/1992 | De Jong | 364/449 |
| 5,124,915 | 6/1992 | Krenzel | 364/420 |

OTHER PUBLICATIONS

Hurn, GPS, A Guide to the Next Utility, Trumble Navigation, Sunnyvale, Calif. (1989), pp. 1–76.
Gaydos et al., The Production of Orthophotographs by Digital Image Processing Techniques, *Proceedings of the Annual Meeting of the ASP-ASCM Convention*, vol. 4 (1986), pp. 241–249.
Trumble Navigation Ltd., Sunnyvale, Calif., Specification No. TFS–91100 (Mar. 1, 1988), pp. 4–16, 37–38.
Moffitt, *Photogrammetry*, International Textbook Company, 2nd Ed. 11867), pp. v–xi, 66–67, 76–77, 96–97, 260–263.
Wysocki, David A. and Hooper, Paul S., Disclosure Document deposited with U.S. Patent and Trademark Office dated Mar. 20, 1990, PTO mail room stamped Apr. 30, 1990.

*Primary Examiner*—Gary Chin
*Attorney, Agent, or Firm*—Stroud, Stroud, Willink, Thompson & Howard

[57] ABSTRACT

Herein is presented a positioning, navigation and collision avoidance system for ships, aircraft, land vehicles and the like, which utilizes a geo-referenced digital orthophotograph data-base and a positioning signal to display upon a computer stereo graphics device a high visibility dynamic photographic image of the user's immediate environment, including both moving and stationary obstacles. The position and temporal data along with the geo-referenced elevation data utilized to derive the digital orthophotograph(s) can serve to warn the user of nearby obstacles; and optionally, to implement semi-automatic avoidance. Substituting user generated x-y-z positions and times, the system may be used in a static mode as a flight simulator or a simulator for other modes of transportation. The system may also be used as a mobile Geographic Information Systems decision making tool with the addition of user supplied geo-referenced digital data layers.

29 Claims, 3 Drawing Sheets

REAL TIME THREE DIMENSIONAL GEO-REFERENCED DIGITAL ORTHOPHOTOGRAPH-BASED POSITIONING, NAVIGATION, COLLISION AVOIDANCE AND DECISION SUPPORT SYSTEM

This is a continuation of application Ser. No. 07/718,618 filed Jun. 21, 1991, now abandoned.

BACKGROUND OF THE INVENTION

A. Field of the Invention

The present invention relates in general to geodesy, cartography and computer technology, and in particular to positioning systems, digital orthophotographs and digital terrain elevation data, and Geographic Information Systems.

B. Prior Art

A variety of computerized information display systems have been developed to function as simulators, vehicular obstacle avoidance systems, and vehicle tracking systems. Such systems use computer generated imagery based on data sets generated either from digitized contour maps or symbolic maps or combinations of both. Typically, such systems include some method of determining the mode of transportation's location in space (utilizing "dead-reckoning" techniques using onboard sensors, transmitting beacons, a satellite positioning system, or combinations of these) and a method of displaying/updating the mode of transportation's location on a digitized symbolic map or chart using computer graphics.

The major drawback in the aforementioned systems is the lack of realistic visual feedback displayed on a graphics monitor along with the mode of transportation's position. Artificially created geographic data (such as is found in flight simulators) or data derived from digitized cartographic contour/elevation maps lack the realism and true photographic detail of the geographic surroundings, such as vegetation and man made structures such as buildings, powerlines, etc. The use of symbolic maps or the addition of symbols to digitized contour maps can provide some information with respect to man made structures and vegetation, but to provide information density comparable to what would be observed by directly looking at a portion of the earth with the naked eye is not practically feasible by symbolic representation. In addition to the time intensive and costly process of making symbolic maps, many features cannot be accurately placed because of cartographic displacement caused by adjacent symbols.

At present, there is no effective way operators of moving modes of transportation such as ships, aircraft or land vehicles can visually ascertain their and each other's positions, if there is no visibility, and be alerted to the proximity of obstructions. This was clearly demonstrated by the environmental disaster caused when the ship, the EXXON VALDEZ, ran aground at night in March of 1989 after leaving Valdez, Alaska and leaked its load of approximately 11,000,000 gallons of crude oil upon the ocean. Other examples are the December 1990 collision of two Northwest Airlines passenger jets at the Detroit, Mich. airport in a dense fog and the collision on Feb. 1, 1991 at Los Angeles International airport at night between a U.S. Air Boeing 737 and an Airwest commuter jet aircraft. In the former case, one airliner was lost and taxied on to an active runway and was hit by the other airliner as it was taking off causing eight deaths, injuries and much damage. In the latter case, the U.S. Air Boeing 737 was mistakenly cleared to land on the runway being used by the Airwest commuter aircraft previously cleared for takeoff. The collision caused 30 deaths.

In other to provide background information so that the invention may be completely understood and appreciated in its proper context, and how it can prevent accidents like the ones described above, reference may be made to a number of prior art patents as follows:

U.S. Pat. Nos. 4,837,700; 4,835,537; 4,682,160 and 4,829,304.

A number of patents such as typified by U.S. Pat. No 4,837,700, to Ando et al, discloses a road vehicle navigation system using a Global Positioning System (GPS) receiver and odometer, angular rate, and geomagnetic sensors. A digitized map of the area is also displayed and scrolled by computer and the operator's position on the map is displayed as determined from the sensors or GPS signals. Digitized symbolic maps or charts used with the above patent, and with vehicle, aircraft, and ship navigation and positioning systems in general, suffer from a number of deficiencies. Symbolic maps or charts show only selected features and only as symbols, and the spaces between the symbols are left blank. Additionally, many features are not accurately placed on symbolic maps because of cartographic displacement caused by adjacent symbols. The digital maps used with the aforementioned systems make little, or no use of different digital data layers to develop (in a dynamic fashion) statistics and make new digital maps of the surrounding environment as position changes, or use geo-referenced terrain elevations to assess distances from obstacles and generate perspective views for added realism. The above patent makes no mention of transformations that must be made when displaying GPS geographic coordinates based on various X-Y map projections and spheroids. This can be a source of error.

Remotely sensed digital satellite image data of the earth can also be used as a map or chart and the operator's position displayed thereon through the use of GPS signals. The image data are fitted to ground by rubber sheeting or warping the common image points in the image and their counterparts on an existing map or chart using their known positions on the ground. This gives a good fit at the registration points, but as one moves away from the registration points accuracy falls off. Additionally, no provision is made to correct for relief displacement. These errors, and the small scale, limit the use of satellite imagery as a map or chart.

U.S. Pat. No. 4,835,537, to Manion, discloses an aircraft warning and avoidance system. All mobile obstacles whether aircraft or vehicles on the ground must be outfitted with radio telemetry devices that receive various TACAN and LORAN and preferably GPS positioning information and transmit their position based upon these incoming signals. Natural obstacles such as mountain peaks or man made objects such as radio towers can also be outfitted with radio telemetry devices that broadcast their location. The pilot of an aircraft is shown a symbolic view of the instrumented objects around the pilot and audibly warned of impending collisions if the present course is maintained. The problem with this system is that not all aircraft and vehicles on the ground may always be instrumented with the costly telemetry transceivers. In addition, it would not be economically practical to instrument all natural objects with the transmitters. The cost of maintaining the instruments at each site in working order also needs to be considered. Distances are calculated between instrumented objects, fixed or mobile (transmitting their respective coordinates), based upon latitude and longitude of the mode of transportation; rather than reduction to a map or chart coordinate system. Such an approach could lead to inaccuracies along the equator or in polar regions due to earth curvature. Again, as with the above patents, only a symbolic display is shown of the surrounding environment, and not realistic geo-referenced photographic quality imagery to guide the operator.

U.S. Pat. Nos. 4,682,160, to Beckwith et. al, and 4,829,304 to Baird, introduce a new component to navigation and aircraft navigation in particular, the use of digital geo-referenced terrain data. The former uses terrain elevations to generate a shaded relief perspective view image in real time of the terrain, in consonance with pitch, roll and yaw of the aircraft, over which the aircraft is flying. The imagery displayed however, is synthetic as it is derived by computer graphics shading techniques based upon adjacent elevation differences and does not show the landscape in true photographic detail, which is a primary object of the current invention. The latter uses various aircraft instruments such as a barometer, radar altimeter readings, and estimated position from the onboard navigation system to compare a sensed profile of digital terrain data to a corresponding profile of stored digital terrain data. When a match is found, the onboard navigation system is updated with the new position. Thus the piloted or automatic guidance (pilotless) mode of transportation is able to navigate and avoid obstacles. Again these two schemes use onboard sensors to determine position. Sensors accumulate error as distances increase between correlation points. Where there are no terrain differences, as over water, both systems would become unreliable as there would be no terrain profiles with which to correlate the stored terrain data. Additionally, in the latter system, barometric pressure can be influenced by current weather conditions and gusts of wind can disorient the mode of transportation and give erroneous radar altimeter readings. This makes it difficult or impossible to obtain a reliable terrain profile with which to make a correlation with stored terrain data. Again, these systems do not show the pilot's position in a visual photographic image of the terrain or water over which the aircraft is flying.

Present day training simulators for various modes of transportation, particularly aircraft flight simulators and warfare mission planning systems and other devices such as video games, use artificially generated imagery for training or entertainment. Computer simulated imagery detracts from the simulation and lacks the realism of photographic imagery.

Geographic Information Systems (GIS) technology is now used with user input parameters to model various geo-referenced data sets in order to gain new information about the environmental relationships between various data sets. This is done in a static mode at a single site. In a dynamic situation such as a forest fire, it may not be obvious what to model at a distant office site based upon untimely user reported conditions in order to forecast the spread of the fire and the subsequent decisions that would have to be made to evacuate personnel and to allocate both personnel and resources to fight the fire.

SUMMARY AND OBJECTS OF THE INVENTION

Whatever the precise merits, features and advantages of the above cited references, none of them achieves or fulfills the purposes of showing the operator or user of a mode of transportation, through the use of computer technology, his/her position dynamically in a geo-referenced digital Orthophotograph of the surrounding environment, and of warning the operator of nearby objects and other modes of transportation and presenting the operator with an attributed graphic display of the surrounding environment for implementation of user input parameters to develop new statistics and/or thematic displays of the environment or to implement new actions.

Digital Orthophotographs are now becoming generally available to the public. Techniques are being perfected to perform photocorrelation by computer of aerial photographs meaning that digital terrain elevation data will be derived directly from the aerial photograph using the appropriate computer algorithms. This has the important implication that custom Orthophotographs along with their associated digital terrain elevation data will be increasingly easier and inexpensive to produce and update on a regular basis.

What is truly novel about the use of digital Orthophotographs is that the user of a mode of transportation will be able to dynamically visualize his/her position in relation to the surrounding area in either two or three dimensions, through an appropriate display, regardless of the time of day and weather conditions, in photographic detail at map or chart accuracy standards. Oftentimes digital terrain elevation data are corrected so that vegetation and man made objects do not affect the elevation values, but it should be mentioned that these corrections may not always be desirable depending on the application. For example, if a plane were flying at a very low altitude as would be the case near an airstrip, one would want the elevations of treetops, limbs, powerpoles, buildings, etc. to be present in the digital terrain elevation data.

Accordingly, it is a principle object of the present invention to provide greater realism and greater safety to operators of various modes of transportation by visually displaying their current position, as obtained from a Positioning System (PS) receiver(s), upon a computer controlled graphics display device concurrently with a geo-referenced digital Orthophotographic map with a horizontal accuracy equal to a symbolic map or chart of the same scale and area. The graphics display realistically represents in photographic detail the surrounding environment in bright daylight regardless of whether it is day or night or whether there are inclement weather conditions, and dynamically updates the position of the mode of transportation on the display as its position changes.

In consonance with the above object, it is another object of the invention to provide greater safety through the use of geo-referenced digital terrain elevation and/or bathymetric sounding data (from which the digital Orthophotograph was made) to warn operators of modes of transportation visually and/or audibly of nearby obstructions.

In consonance with the above objects, it is another object of the invention to provide greater safety through the capability to transmit and receive positional, temporal and identification data from other modes of transportation and structures. This capability allows the operator to be informed of the presence of other modes of transportation and other potential obstructions that would not normally be included in the digital Orthophotographs and their associated elevation data.

Furthermore in consonance with the above objects, it is also an object to provide greater safety and greater viewing realism through the use of custom made digital terrain elevation and/or bathymetric sounding data containing digitized man made structures such as buildings, powerlines, radio transmission towers, and the like, to warn the operators of modes of transportation of nearby man made structures and to produce digital Orthophotographs from aerial photography exposed at progressively lower altitudes near arrival and departure points (and at other trajectory points where navigation is potentially dangerous) as would be the case, for example, in which an aircraft changes altitude in order to land and take-off.

Also in consonance with the above objects, it is an object of the invention to provide greater analytical capabilities to trip recorders by saving the digital positions, directions, velocities, and temporal coordinates of modes of transportation generated by a Satellite Positioning System or other Positioning System to a digital file or trip recorder. This data can then be subsequently studied by correlating the stored positioning system spatial and temporal coordinates to their appropriate Orthophotographs to recreate the mission of the mode of transportation.

Again in consonance with the above objects, it is another object to provide greater visual terrain realism to an operator of a mode of transportation with the use of three dimensional stereo digital orthophotographs based upon the accompanying elevation data used to make the Orthophotographs, and optionally to provide dynamic perspective terrain views where translations about the x-y-z axes of the mode of transportation are known and project these views to the operator through the use of various stereo display technologies. Such perspective views would also include remote views of the mode of transportation as seen from a virtual remotely located observer. In other words, the operator of a mode of transportation could view in real-time, via the on-board display, his/her relationship to the surrounding area and other modes of transportation, with respect to the operator's craft/vehicle, as if he/she were looking through the eyes of an observer stationed at some chosen point remote from the craft/vehicle.

In consonance with the above object, it is another object to provide greater visual terrain realism in static transportation training simulators, particularly flight simulators, and to provide greater terrain realism for military mission planning, tactical situations, and video games through the use of digital Orthophotographs which could be viewed in either two or three dimensions.

In consonance with the above objects, it is another object of the invention to provide greater decision making capabilities to the users of a mode of transportation, through the use of Geographic Information Systems technology to produce a dynamic and timely statistical analysis or digital data layer and/or thematic map or chart based upon the user's current position, digital Orthophotographs and digital terrain elevation and/or bathymetric sounding data and various other user supplied geo-referenced digital data layers.

In one aspect, the present invention is a position tracking device for use with digital orthophotographs and digital elevation maps representing a predefined geographic area. The position tracking device includes a means for entering user input data; a means for obtaining position data corresponding to the position of the device in three-dimensional space; a first data array corresponding to a digital orthophotograph of the predefined area which includes the horizontal X-Y coordinates of the position; a second data array corresponding to digital terrain elevation data and/or digital bathymetric sounding data of the predefined area which includes the horizontal X-Y coordinates of the position; a means for accessing the position data, the first data array, the second data array, the user input data; a means for storing the position data, the first data array, the second data array, and the user input data; a means for processing the position data, the first data array, the second data array, and the user input data so that the processed position data corresponds to unique coordinates in the processed first data array and the processed second data array; a means for outputting the processed position data, the processed first data array, the processed second data array, and the processed user input data into a visual display to provide pictorial information relating the position to its geographic surroundings.

The information contained in the first and the second data arrays is geo-referenced. The device also includes a means for transforming the position data to their respective coordinates in a geo-referenced coordinate system. The position data comprises computer or user-generated data and is supplemented by data corresponding to the orientation (pitch, roll, and yaw) of the mode of transportation; such data can also be computer generated data. The device further includes a means for storing and accessing a plurality of the first and the second data arrays for a plurality of predefined areas.

The position tracking device further includes a means for obtaining temporal data corresponding to the time(s) at which the position data is acquired. The means for obtaining the temporal data uses the temporal data to date the position data. The means for obtaining position data corresponding to the position of the device in three-dimensional space comprises the use of positioning system signals for producing the position data and optionally provides temporal data corresponding to the time(s) at which the position data is acquired.

As a further option, the position tracking device can be used in a static mode.

The visual display is a two-dimensional or a three-dimensional graphics display.

The position tracking device of the present invention further includes a means of further processing the processed data in order to provide a visual display of photographic quality of the predefined area or a portion of the predefined area. The means of processing the processed data provides perspective or remote perspective views of a predefined area or portion of a predefined area. The means of processing the processed data provides perspective or remote perspective views of the predefined area or portion of the predefined area.

The invention also includes a means for further processing the processed data to control semi-automatic collision avoidance equipment, and/or to output a warning.

The device also includes a means for broadcasting the position data along with identification data identifying the source of the broadcast data, and optionally along with temporal data corresponding to the time(s) at which the position date is acquired, to other modes of transportation and/or structures capable of receiving the broadcast data.

The device further includes a means of archiving to a storage device, the position data and optionally temporal data corresponding to the times at which the position data is acquired. The device includes a means of obtaining and processing any position data, temporal data, and identification data broadcast from other modes of transportation and/or structures and includes a means of archiving to a storage device, the position data and optionally temporal data corresponding to the time(s) at which the position data was acquired, along with any position, temporal, and identification data received from other modes of transportation and/or structures.

The device also includes the use of high resolution custom made digital orthophotographs at various scales with their associated custom made arrays of digital terrain elevation and/or bathymetric sounding data. The custom made digital orthophotographs and their associated custom made arrays of digital terrain elevations and/or bathymetric sounding data include digitized representations of man-made structures.

The first data array and the second data array are supplemented by data arrays corresponding to user-supplied digital data layers including the horizontal X-Y coordinates of the position. The information contained in the user supplied digital data layers is geo-referenced.

The device includes the use of geographic information systems technology for processing the position data, the user input data, and the first and second data arrays. The first and second data arrays are supplemented by data arrays corresponding to user supplied digital data layers including the horizontal X-Y coordinates of the position. The information contained in the user supplied digital data layers is geo-referenced.

Another aspect of the present invention is a position tracking method for use with digital orthophotographs and digital elevation maps representing a predefined geographical area. The method in accordance with the present invention comprises, with no implicit order, the steps of: entering user input data; obtaining position data corresponding to a position in three-dimensional space; utilizing a first data array corresponding to a digital orthophotograph of the predefined area which includes the horizontal X-Y coordinates of the position; utilizing a second data array corresponding to digital terrain elevation data and/or digital bathymetric sounding data of the predefined area which includes the horizontal X-Y coordinates of the position; accessing the position data, the first data array, the second data array, and the user input data; storing the position data, the first data array, the second data array and the user input data; processing the position data, the first data array, the second data array, and the user input data so that the processed position data corresponds to unique coordinates in the processed first data array and the processed second data array; and outputting the processed position data, the processed first data array, the processed second data array, and the processed user input data to a visual display to provide pictorial information relating the position to its geographic surroundings.

The information contained in the first and the second data arrays is geo-referenced. The position data comprises computer or user generated data. The position data is supplemented by data corresponding to the orientation (pitch, roll and yaw) of the mode of transportation; such data may be computer generated data.

The method in accordance with the present invention further includes obtaining temporal data corresponding to the time(s) at which the position data is acquired, and using the temporal data to date the position data.

The method further includes transforming the position data to their respective coordinates in a geo-referenced coordinate system.

The method further includes storing and accessing a plurality of the first and the second data arrays for a plurality of predefined areas.

The method of the present invention wherein the step of obtaining position data corresponding to a position in three-dimensional space comprises the use of Positioning System signals for producing the position data and optionally to provide temporal data corresponding to the time(s) at which the position data is acquired.

The present invention further comprehends the steps of the method are performed in a static environment.

The method of the present invention comprehends the visual display is a two-dimensional or a three-dimensional graphics display.

The method of the present invention includes further processing the processed data in order to provide a visual display of photographic quality of the predefined area or portion of the predefined area and includes processing the data to provide perspective or remote perspective views of the predefined area or portion of the predefined area.

The method of the present invention includes further processing the processed data to control semi-automatic collision avoidance equipment, and/or to output a warning.

The method of the present invention includes broadcasting the position data along with identification data identifying the source of the broadcast data, and optionally along with temporal data corresponding to the time(s) at which the position data is acquired, to other modes of transportation and/or structures capable of receiving the broadcast data.

The method of the present invention further comprehends archiving to a storage device, the position data and optionally temporal data corresponding to the times at which the position data is acquired.

The method of the present invention includes obtaining and processing any position data, temporal data, and identification data broadcast from other modes of transportation and/or structures and further includes a means of archiving to a storage device, the position data and optionally temporal data corresponding to the time(s) at which the position data was acquired, along with any position, temporal, and identification data received from other modes of transportation and/or structures.

The method of the present invention further includes the use of high resolution custom made digital orthophotographs at various scales with their associated custom made arrays of digital terrain elevation and/or bathymetric sounding data. The custom made digital orthophotographs and their associated custom made arrays of digital terrain elevations and/or bathymetric sounding data include digitized representations of man-made structures.

The first data array and the second data array are supplemented by data arrays corresponding to user-supplied digital data layers including the horizontal X-Y coordinates of the position. The information contained in the user supplied digital data layers is geo-referenced.

The method of the present invention includes the use of geographic information systems technology for processing the position data, the user input data, and the first and second data arrays. The first and second data arrays are supplemented by data arrays corresponding to user supplied digital data layers including the horizontal X-Y coordinates of the position. The information contained in the user supplied digital data layers is geo-referenced.

DETAILED DESCRIPTION OF THE PREFERRED EMBODIMENT

Before proceeding with a detailed description of the present invention, a number of definitions are presented, and are herein incorporated into this description by reference, so that the invention can be better understood and appreciated.

Positioning System (PS). A group of transmitters emitting coded identification and timing signals such that a commercially available PS receiver can decode, and through look up tables, determine and broadcast the position of the receiver twenty-four hours a day all year around on a dynamic basis. In many cases, the most likely candidate for a PS would be a Satellite Positioning System (SPS) such as the Global Positioning System (GPS). At present, commercially available receivers are capable of providing positional information about every second within an X-Y error of 25 meters and with an additional reference receiver at a known static location, 2 to 5 meters or less. Z errors would be two three times the X-Y errors. It is expected that these errors will decrease in the future as PS receiver technology advances. A more detailed description of an SPS may be gained from, *GPS, A Guide to the Next Utility*, Jeff Hurn for Trimble Navigation, 1989, Trimble Navigation, 645 Mary Avenue, Sunnyvale, Calif., 94088. Other examples of Positioning Systems include groups of earth-based transmitting beacons at known locations emitting the necessary coded information, and the Soviet orbiting satellite Global Navigation System (GLONASS).

Picture Element (pixel). The smallest digital data element having information attributes and usually having a radiometric resolution of eight bits or one byte for display and analysis purposes.

Digital Image. A scene of the earth composed of pixels, that have been acquired by digitizing daylight bright black and white or color aerial photography, or by passive means from a satellite orbiting the earth, digitized and transmitted to earth.

Geo-Referenced. Digital imagery, digital data, or pixels that can be related to the surface of the earth through a map or chart projection system such as geographic (longitude, latitude, and altitude) or an X-Y-Z system, e.g., the State Plane (SP) or Universal Transverse Mercator (UTM) or the like and various horizontal and vertical datums such as the North American Datum of 1927 (NAD27) based on the Clarke spheroid of 1866 or NAD83 based on the Geodetic Reference System 1980 (GRS80) spheroid or the like and z values expressed as feet or meters.

Raster Data. An array or matrix composed of rows and columns of digital data elements or pixels having a uniform horizontal spacing.

Vector Data. A group of digital data elements or pixels occurring randomly and not having a uniform horizontal spacing.

Digital Orthophotograph. A digital image map or chart composed of a raster of pixels (derived from digitized aerial photography, digital satellite data, or the like) that have been each geometrically corrected to remove all errors due to translations about the x, y, and z axes of the imaging platform in relation to the plane of the earth at the time of exposure or recording and the removal of relief displacement by differential rectification of each pixel with a geo-referenced array of terrain elevations or bathymetric soundings and the above computed axial translation constants such that an orthorectified geo-referenced digital image map or chart is created that is orthogonally correct and has the same orthogonal and accuracy criteria as a conventional symbolic map or chart of the same scale and area that the digital Orthophotograph portrays. A more detailed description of digital Orthophotographs may be gained from *The Production of Orthophotographs by Digital Image Processing Techniques*, Leonard Gaydos, Lyman Ladner, Richard Champion and David Hooper, Proceedings of the Annual Meeting of the ASP-ASCM Convention, Washington, D.C., Mar. 16–21, 1986, Vol. 4, pp. 241–249.

Data Layer. A set of geo-referenced digital data points having a common theme but differing in value or attributes, e.g., a raster of terrain elevation attributes (digital elevation map), a digital Orthophotograph (raster of brigthness value attributes for analysis or display), or a hydrographic or transportation network of vector data. Digital data layers may be public domain, such as the U.S. Census Bureau digital data files, U.S. Geological Survey's Digital Line Graphs (DLG) and Digital Elevation Models (DEM) (arrays of terrain elevations), or the Defense Mapping Agency (DMA) Digital Terrain Elevation Data (DTED), etc., or proprietary, such as distribution routes, timber holdings, socio-economic areas, customer locations, custom made high resolution digital data layers such as arrays of terrain elevations or below sea level (bathymetric) arrays of soundings, etc.

Geographic Information System (GIS). Computer software and hardware, using user input parameters, that determines relationships, between attributed geo-referenced digital data layers covering the same geographic coordinate area, be they raster and/or vector. Output may be tables of statistics and/or a new geo-referenced digital data layer and/or map or chart depicting the thematic relationships between the digital data layers. Examples of such GIS processed digital data layers are population maps, vegetation maps, soil maps, or any map that associates data with geographic positions.

Figure 1:
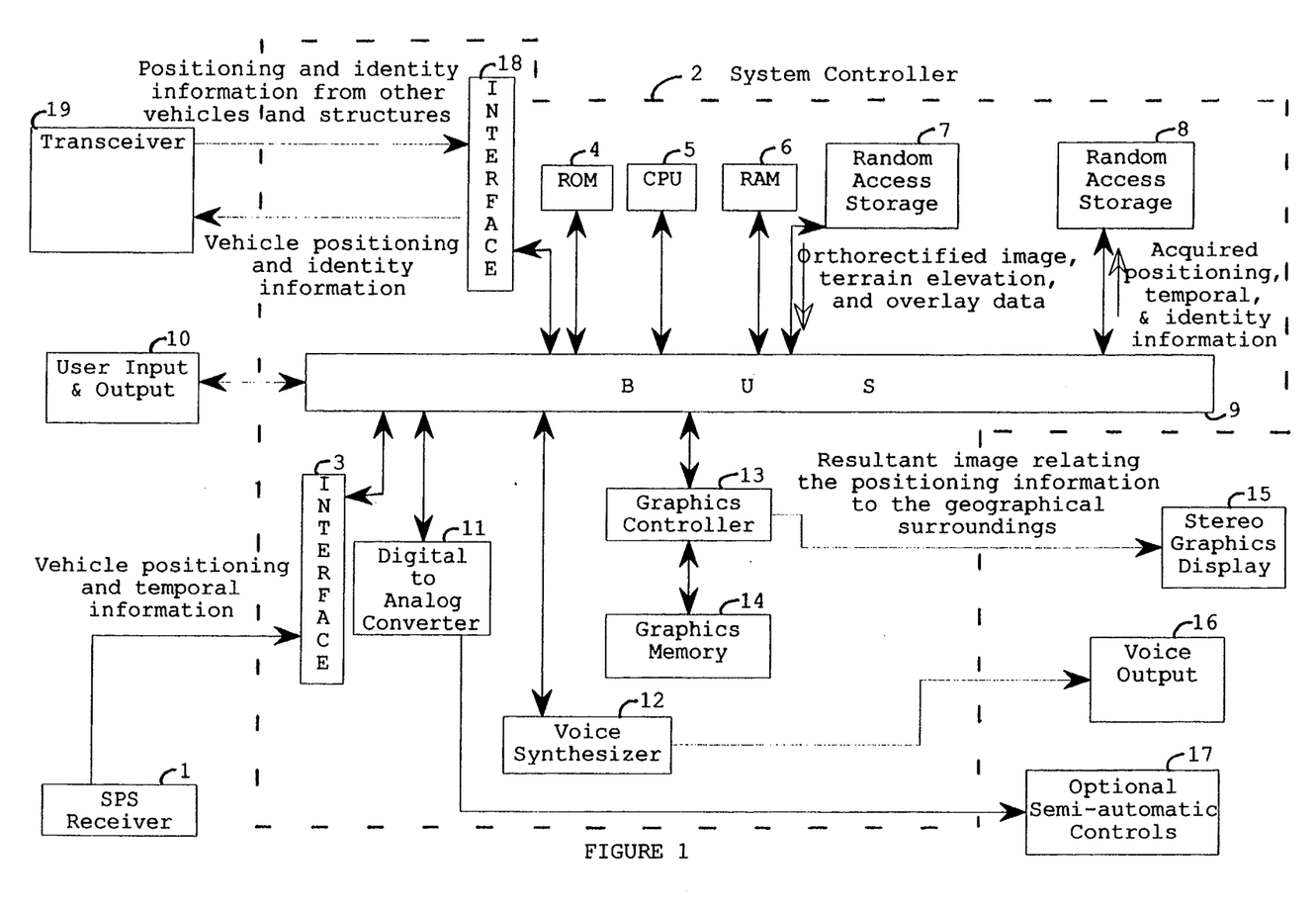
FIG. 1 is a block diagram showing the apparatus needed to implement the most preferred embodiment of the invention.

Referring now specifically to FIG. 1, there is illustrated the most preferred embodiment of the use of an SPS and digital Orthophotographs in modes of transportation such as ships, aircraft or land vehicles or the like. SPS signals are received by SPS receiver(s) 1 disposed at one or more locations on the mode of transportation. The SPS receiver(s) 1 outputs its digital latitude(s), longitude(s), and altitude(s) time(s) (LLAT) or X-Y-Z and time positions (XYZT) which enter the system controller 2, which broadcasts, via an interface 18 and a transceiver 19 the LLATs or XYZTs and identification data of the mode of transportation to other systems capable of receiving this information. Also any LLATs or XYZTs and identification data received via interface 18 and transceiver 19 from other modes of transportation or objects equipped to transmit this information are entered into the system controller 2. The system controller is made up of an interface 3, a ROM 4 (Read Only Memory), CPU 5 (Central Processing Unit), RAM 6 (Random Access Memory), two Random Access Storage Devices (RASDs) 7 and 8, a Bus 9, user input and output (I/O) device 10, a digital to analog converter (DAC) 11, voice synthesizer 12, graphics controller 13 which could include high-speed digital signal processing and advanced graphics algorithms for higher throughput in the case of more advanced graphic displays, associated graphics memory 14, graphics display 15 (which could be a three-dimensional image stereo or holographic heads-up display or other suitable display for greater realism), voice output 16, optional semi-automatic controls 17 via interface 18 and transceiver 19 for transmitting and receiving positioning and identification information to and from other vehicles and structures. The interface 3 passes the LLAT or XYZT to the CPU 5 via the Bus 9 where they are acted upon by executable programs fetched from RAM 6 and necessary information for system operation fetched from ROM 4. The CPU 5 executes many programs such as obtaining operator parameters from the operator I/O device 10 (which comprises a terminal and keyboard or the like), the current SPS LLAT(s) or XYZT(s), fetching the proper digital Orthophotographs and associated digital terrain elevation or sounding data from Random Access Storage Device 7 for storage in RAM 6, and subsequent processing by CPU 5 for storage in graphics memory 14 and display by the graphics controller 13 to the graphics display 15. The LLATs or XYZTs would be stored by CPU 5 in Random Access Storage Device 8 for later analysis (which could involve, for example, subsequently combining the data from Random Access Storage device 8 with the appropriate Orthophotographs and data layers in order to recreate the mission in a similar Orthographic display system). In addition, the CPU 5 would invoke user programs to interrogate the digital terrain elevation and/or sounding data for the possibility of nearby obstacles; and if within user set parameters, vocally warn the user through the voice synthesizer 12 to the voice output 16. Additionally in a similar fashion, the operator can be warned of other vehicles or structures (which broadcast their coordinates and identification data which can then be processed by the receiving system and included in the visual display so that the navigator is aware of what type of vehicle or structure is in proximity, its distance, its rate of approach, etc.) within a given radius. If evasive maneuvers are not undertaken within a certain time frame, the CPU 5 can optionally activate through DAC 11 semi-automatic control 17 of the mode of transportation. When the operator's position is no longer in the domain of the digital Orthophotographs stored in RAM 6, additional Orthophotographs and digital terrain elevation an/or sounding data corresponding to the operator's new position are fetched from Random Access Storage Device 7 for processing by CPU 5 for display by graphics display 15.

Figure 2A:
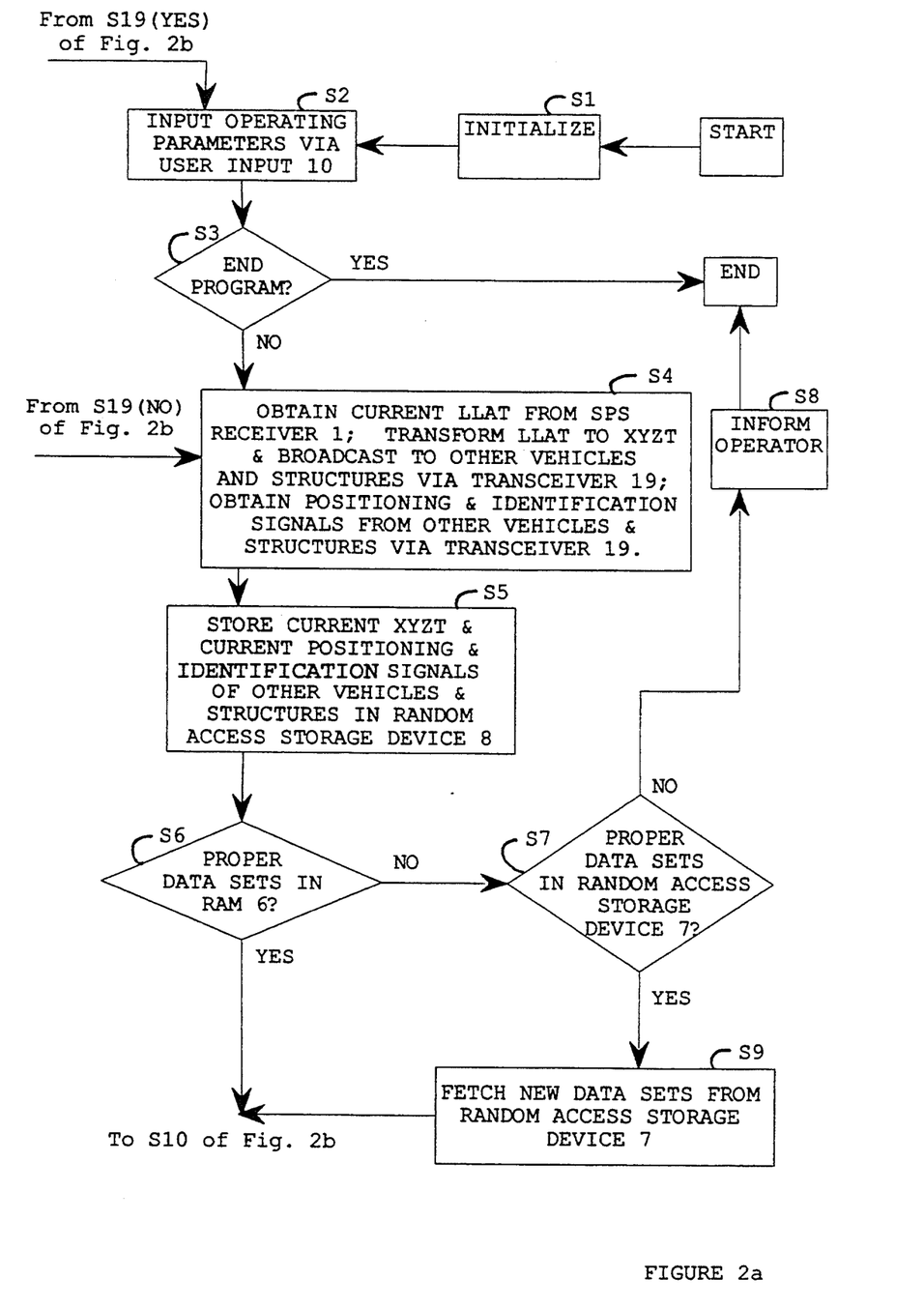
FIGS. 2a and 2b are a flowchart showing the logic flow through the apparatus of FIG. 1 for implementation of the present invention.
Figure 2B:
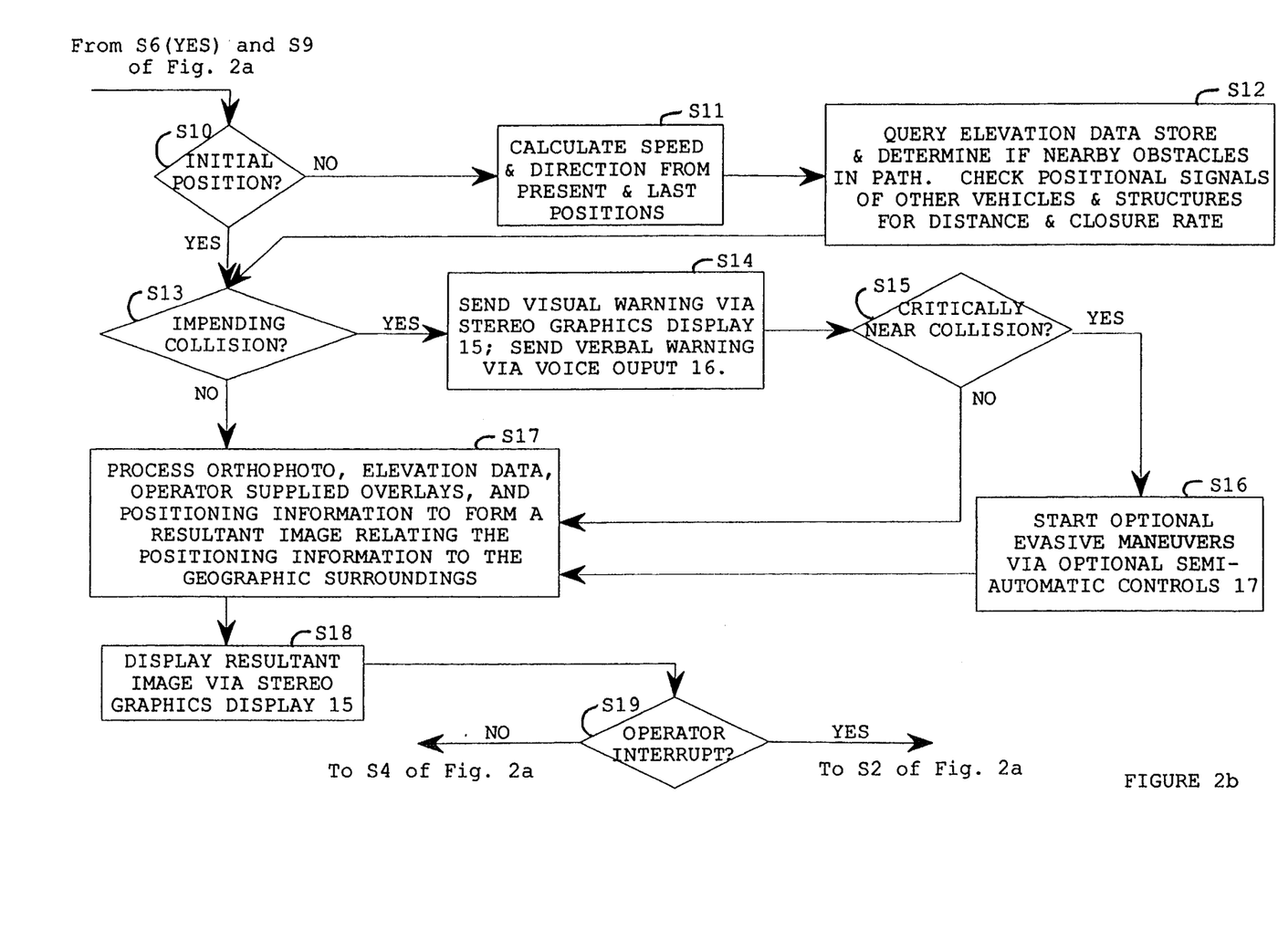

Refer now to FIG. 2 which shows a diagram and flow of logic through the apparatus shown in FIG. 1.

The CPU 5 first performs an initializing step S1 for activating the program and then prompts the operator through I/O device 10 for operator input parameters S2 for user written programs. Input parameters (such as the size of the craft, its unique identification number, the extremities of the craft, the location(s) of the SPS receiver(s), etc.) can be a table of types of ships, aircraft or land vehicles or the like and their associated operational characteristics from which to chose. If the precise type is not present, the operator may build a table of operational characteristics for the operator's mode of transport. Other parameters may be whether or not semi-automatic control 17 is present and to be activated; presence in memory of Orthophotographic map or chart projection, code, and spheroid; selection of desired controls and methods of displaying the Orthophotographs on the graphics display (such methods and controls would include generation of stereo Orthophotographs, generation of perspective Orthophotographs depending on operator input viewing direction and elevation angle, or automatic calculation from axial translations of x-y-z values (pitch, roll, and yaw of the mode of transportation) from SPS receivers (if a receiver is employed at more than one location), or generation of remote perspective views of the relationship between the surrounding area and the mode of transportation as would be seen by an observer at a chosen point in space away from the mode of transportation; activation of obstacle detection and warning; semi-automatic avoidance; and end program.

A test is made at step S3 to determine if the operator wants to end program. If not, the current LLAT(s) or XYZT(s), and current LLATs or XYZT(s) and identification data from other nearby modes of transportation S4 are obtained from SPS receiver(s) 1 and transformed (if needed) to the proper projection, zone, and spheroid of the Orthophotographs and are written S5 to Random Access Storage Device 8 for later use and analysis.

Next a test S6 is made to determine if the proper Orthophotographs, digital terrain elevation and/or sounding data, and any other relevant operator data sets are in memory 6; if not, do data sets exist S7, if not, notify user S8 visually via graphic display 15 and verbally through voice synthesizer 12 and voice output 16, and end program; otherwise obtain S9 new data set from Random Access Storage device 7 and store in RAM 6 before proceeding to S10.

A test is next made S10 to determine if this is the initial position; if not, the previous X-Y-Z position and time is used with the present ones to calculate S11 the present speed, direction and position of the mode of transport. Following this, the distances from other nearby modes of transportation (or structures) emitting their own LLATs or XYZTs and identification data are determined and the digital terrain elevation and/or sounding data is queried S12 using operator parameters as to the presence of nearby obstacles.

If other nearby modes of transportation and/or obstacles are present S13, the operator is warned by visually indicating and/or emphasizing the impending danger on the graphics display 15 and activate S14 voice synthesizer 12 and send verbal warning to voice output 16. If other nearby modes of transportation and/or obstacles are critically near S15, as determined from operator input parameters, and operator input is lacking within a preset time frame, initiate optional evasive maneuvers S16 through DAC 11 and semi-automatic controls 17 using operator parameters.

Finally the Orthophotograph, digital terrain elevation and/or sounding data set and any operator overlays are processed S17 by CPU 5 for viewing. Processing would include the drawing of an overlay vector from the last SPS position to the present position on a graphics overlay. In addition, this would also be done using the LLATs or XYZTs and identification data received from other nearby modes of transportation and/or obstacles. Any necessary stereo and/or perspective processing required for added realism, processing and integration of any operator supplied digital data overlays would also be performed by CPU 5. The processed Orthophotograph and overlays are sent to the graphics controller 13 for storage in graphics memory 14 and display S18 by the graphics display 15.

If the operator initiated a user interrupt, this is determined at S19 and steps S2 through S3 are repeated and optionally S4 through S19. If there is no operator interrupt, steps S4 through S19 are repeated indefinitely.

Another embodiment of the invention is its use in a static mode as a training simulator, such as a flight simulator, warfare mission planning, training, and attack simulation, and use as entertainment such as in video games. In this embodiment the SPS receiver(s) 1 in FIG. 1, and steps S4 in FIG. 2 are suppressed and replaced by X-Y-Z positions and times generated from user and computer generated data sets.

In yet another embodiment of the invention, is its use as a decision making tool, rather than primarily as a navigation and collision avoidance tool. The configurations in FIGS. 1 and 2 remain the same. The emphasis here is on dynamic decision making by the user. An example would be the use of the invention in a land vehicle used as a mobile command post during a forest fire and could show the user the user's current position in the Orthophotograph. User inputs of current temperature, humidity, wind direction and velocity data, vegetation types and combustibility, and transportation data layers; this combined with a digital terrain elevation data set and its inherent slope and aspect information, could be used to compute and display a new forecast map of the spread of the fire and the user's current position. This would aid in timely decision making, such as evacuation plans and allocation of personnel and resources and the like to fight the fire.

In summary, according to the present invention, there is provided a positioning, navigation and collision avoidance system for various modes of transportation utilizing one or more SPS receivers to gather positional data in conjunction with the use of geo-referenced digital Orthophotographs in order to present a realistic display of the area surrounding the trajectory of the mode of transportation viewed in bright daylight regardless of time of day or weather conditions. Also provided is the capability to broadcast the mode of transportation's LLATs or XYZTs and identification data to other systems capable of receiving this information, as well as the capability to receive LLATs or XYZTs and identification data from other nearby modes of transportation and/or obstacles so that the operators display is supplemented with information with respect to other moving objects and objects that are not normally included in the digital Orthophotographs and their associated elevation maps. The invention also incorporates the use of an array of geo-referenced terrain elevation and/or bathymetric soundings from which the Orthophotographs were derived, the use of various other operator provided geo-referenced digital data layers, and a system controller to process the above data sets into a meaningful display that dynamically shows the operator's position in relation to the surrounding terrain or water, and in relation to other nearby modes of transportation. Additional computer processing of the array of geo-referenced elevations and/or soundings provides verbal and visual information to the operator regarding nearby obstacles to avoid, and in extreme cases, optional semi-automatic avoidance maneuvers by the mode of transportation when operator input is lacking. With the use of other SPS receiver locations, custom made high resolution Orthophotographs and arrays of terrain elevations and/or soundings including, and if needed, digitized man-made structures can be utilized for greater resolution, precision and display quality. In addition, the array of terrain elevations and/or soundings can be used to compute stereo and perspective Orthophotographs for display to add greater realism to the display. The use of a general purpose system controller or computer provides the means to store the SPS positions, times, velocities, etc., of the mode of transportation on a random access device which can be subsequently combined with the appropriate Orthophotographs and data layers to recreate the mission for analysis. Computer generated X-Y-Z positions and times may be substituted for the SPS receivers and the system may be used in a static mode in conjunction with a mode of transportation simulator such as a flight simulator, or in military warfare, mission planning or training exercises, or in video games to add greater realism to the simulation. The described system may also be used as a mobile decision making tool with the use of additional user-supplied geo-referenced digital data layers with which the geo-referenced Orthophotographs and arrays of terrain elevations and/or bathymetric soundings are used in conjunction with GIS software to generate statistics, new digital data layers and/or thematic maps of the surrounding environment, from which timely and meaningful decisions can be made.

The foregoing description of the preferred and alternative embodiments of the invention have been presented for purposes of illustration and description. For example, an SPS was cited as the method of obtaining the spatial and temporal coordinates of the mode of transportation, but any PS (Positioning System) or combination of PSs could be used in its place. The description is not intended to be exhaustive or to limit the invention to the precise forms disclosed. Many modifications and variations are possible in light of the above description. It is intended that the scope of the invention be limited not by this detailed description, but rather by the claims appended hereto.

What is claimed is:

1. A vehicle position tracking and display system, comprising:

positioning means for providing positional coordinate signals corresponding to spatial coordinates of a current position of a vehicle;

computational means for accessing an image library of differentially rectified images for predefined geographic area, indexed by spatial coordinates, and a data library of terrain elevational data of said predefined geographic areas, indexed by said spatial coordinates of said current position of said vehicle; for receiving said positional coordinate signals; and for analyzing said positional coordinate signals by selecting said differentially rectified images from said image library and said terrain elevational data from said data library;

processing said positional coordinate signals, said selected differentially rectified images, and said terrain elevational data into resultant differentially rectified image signals corresponding to the current position and terrain of said vehicle; and display means responsive to said resultant differentially rectified image signals for translating said resultant differentially rectified image signals into visual, pictorial information corresponding to the current position and geographic surroundings of said vehicle.

2. The system of claim 1, wherein said positional coordinate signals are derived from a positioning system.

3. The system of claim 1, wherein said vehicle is a ship, aircraft, or land vehicle.

4. The system of claim 1, wherein said positional coordinate signals further include orientation signals corresponding to the pitch, roll and yaw of said vehicle.

5. The system of claim 1, wherein said spatial coordinates are three dimensional, geo-referenced coordinates.

6. The system of claim 1, wherein said image library of differentially rectified images is derived from digitized aerial photography using said data library of terrain elevational data to make geometric corrections.

7. The system of claim 1, wherein said differentially rectified images are digital orthophotographs.

8. The system of claim 1, further comprising means for generating vehicle signals corresponding to structural vehicle parameters, and said computational means includes means for receiving said vehicle signals and for analyzing said vehicle signals, to provide a spatial representation of said vehicle.

9. The system of claim 1, wherein said positioning means is operatively coupled to timing means for providing timing signals corresponding to the temporal coordinates of said vehicle's position.

10. The system of claim 9, wherein said computational means further comprises means for storing said positional coordinate signals and said timing signals of said vehicle's position.

11. The system of claim 1, wherein said positioning means is operatively coupled to transmitting means for broadcasting said positional coordinate signals of said vehicle to an object external to said vehicle, and is operatively coupled to receiving means for intercepting broadcast position data corresponding to spatial coordinates of said object external to said vehicle wherein said object external to said vehicle comprises other vehicles, structures or a combination thereof, whose spatial coordinates are not in said data library of terrain elevational data or in said image library.

12. The system of claim 11, wherein said computational means further comprises means for storing said broadcast position data intercepted by said receiving means.

13. The system of claim 11, wherein said computational means further comprises means, responsive to said broadcast position data intercepted by said receiving means, for calculating a distance and rate of approach between said vehicle and said object external to said vehicle.

14. The system of claim 13, further comprising means, responsive to said means for calculating a distance and a rate of approach between said vehicle and said object external to said vehicle, for issuing warning signals corresponding to a predetermined distance and rate of approach between said vehicle and said object external to said vehicle.

15. The system of claim 13, further comprising means, responsive to said means for calculating a distance and rate of approach between said vehicle and said object external to said vehicle, for issuing semi-automatic evasion signals corresponding to a predetermined distance and rate of approach between said vehicle and said object external to said vehicle.

16. The system of claim 1, wherein said computational means further comprises means for calculating a distance and rate of approach between said vehicle and an obstacle, by interrogating said terrain elevational data using said positional coordinate signals.

17. The system of claim 16, further comprising means, responsive to said means for calculating a distance and rate of approach between said vehicle and an obstacle, for issuing warning signals corresponding to a predetermined distance and rate of approach between said vehicle and said obstacle.

18. The system of claim 16, further comprising means, responsive to said means for calculating a distance and rate of approach between said vehicle and an obstacle, for issuing semi-automatic evasion signals corresponding to a predetermined distance and rate of approach between said vehicle and said obstacle.

19. The system of claim 1, wherein said computational means further comprises means, responsive to said terrain elevational data and said resultant differentially rectified image signals, for generating perspective views of said visual, pictorial information corresponding to the geographic surroundings of said vehicle.

20. The system of claim 1, wherein said data library of terrain elevational data, further comprises three dimensional structure data corresponding to digitized man-made structures.

21. The system of claim 1, wherein said computational means further comprises means for accessing a thematic library of thematic data layers corresponding to various predetermined geographic thematic relationships of said predefined geographic areas, indexed by said spatial coordinates of said current position of said vehicle; and for analyzing said positional coordinate signals by selecting said differentially rectified images from said image library and said terrain elevational data from said data library, and said thematic data layers from said thematic library, and processing said positional coordinate signals, said selected differentially rectified images, said terrain elevational data, and said thematic data layers into said resultant differentially rectified image signals corresponding to the current position and terrain of said vehicle.

22. The system of claim 21, wherein said computational means further comprises geographic information system means, for analyzing said positional coordinate signals by selecting said differentially rectified images from said image library, said terrain elevational data from said data library, and said thematic data layers from said thematic library, and processing said positional coordinate signals, said selected differentially rectified images, said terrain elevational data, and said thematic data layers into said resultant differentially rectified image signals corresponding to the current position and terrain of said vehicle.

23. The system of claim 1, further comprising a user input means coupled to said computational means for entering control signals corresponding to input parameters representing predefined system functions, system outputs and vehicle characteristics.

24. The system of claim 1, wherein said image library of said differentially rectified images further comprises differentially rectified images of differing scales and spatial resolutions, and wherein said data library of said terrain elevational data further comprises terrain elevational data of differing spatial resolutions.

25. The system of claim 1, wherein said vehicle is a training simulator or video game.

26. The system of claim 25, wherein said positional coordinate signals are derived via said computational means.

27. The system of claim 1, wherein said differentially rectified images are derived from digital satellite data using said library of terrain elevational data to make geometric corrections.

28. The system of claim 1, wherein said computational means further comprises means, responsive to said terrain elevational data and said resultant differentially rectified image signals, for generating stereo views of said visual, pictorial information corresponding to the geographic surroundings of said vehicle.

29. A method of tracking and display of a vehicle comprising the steps of:
obtaining positional coordinate signals corresponding to spatial coordinates of a current position of said vehicle;
accessing an image library of differentially rectified images of predefined geographic areas, indexed by spatial coordinates, and a data library of terrain elevational data of said predefined geographic areas, indexed by spatial coordinates of said current position of said vehicle;
analyzing said positional coordinate signals by selecting said differentially rectified images from said image library and said terrain elevational data from said data library;
processing said positional coordinate signals, said selected differentially rectified images, and said terrain elevational data into resultant differentially rectified image signals corresponding to the current position and terrain of said vehicle; and
translating said resultant differentially rectified image signals into visual, pictorial information corresponding to the current position and geographic surroundings of said vehicle.

* * * * *